Oct. 6, 1953     G. LA V. RUNKLE ET AL     2,654,633
LEVELING MEANS FOR VEHICLES
Filed Jan. 29, 1952     5 Sheets-Sheet 5
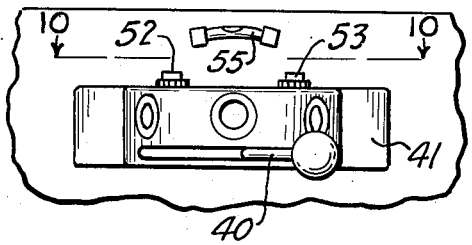
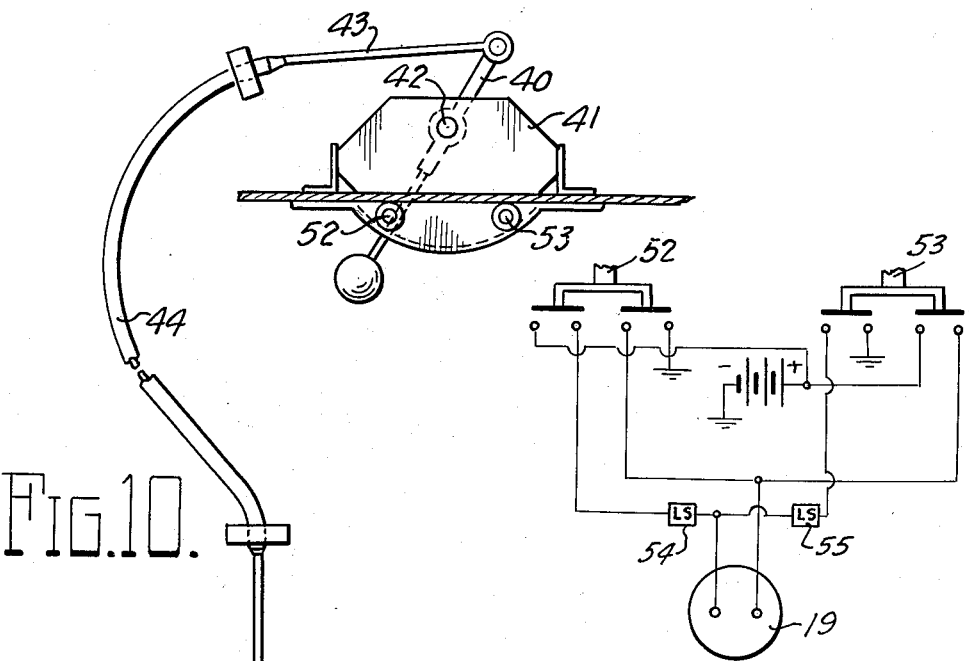
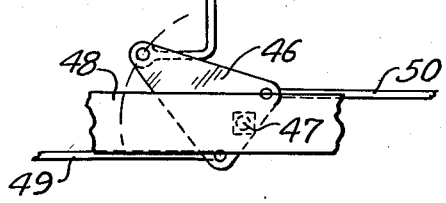
INVENTORS
George LaVerne Runkle
Donald H. Cox
BY
Owen & Owen
ATTORNEYS Patented Oct. 6, 1953

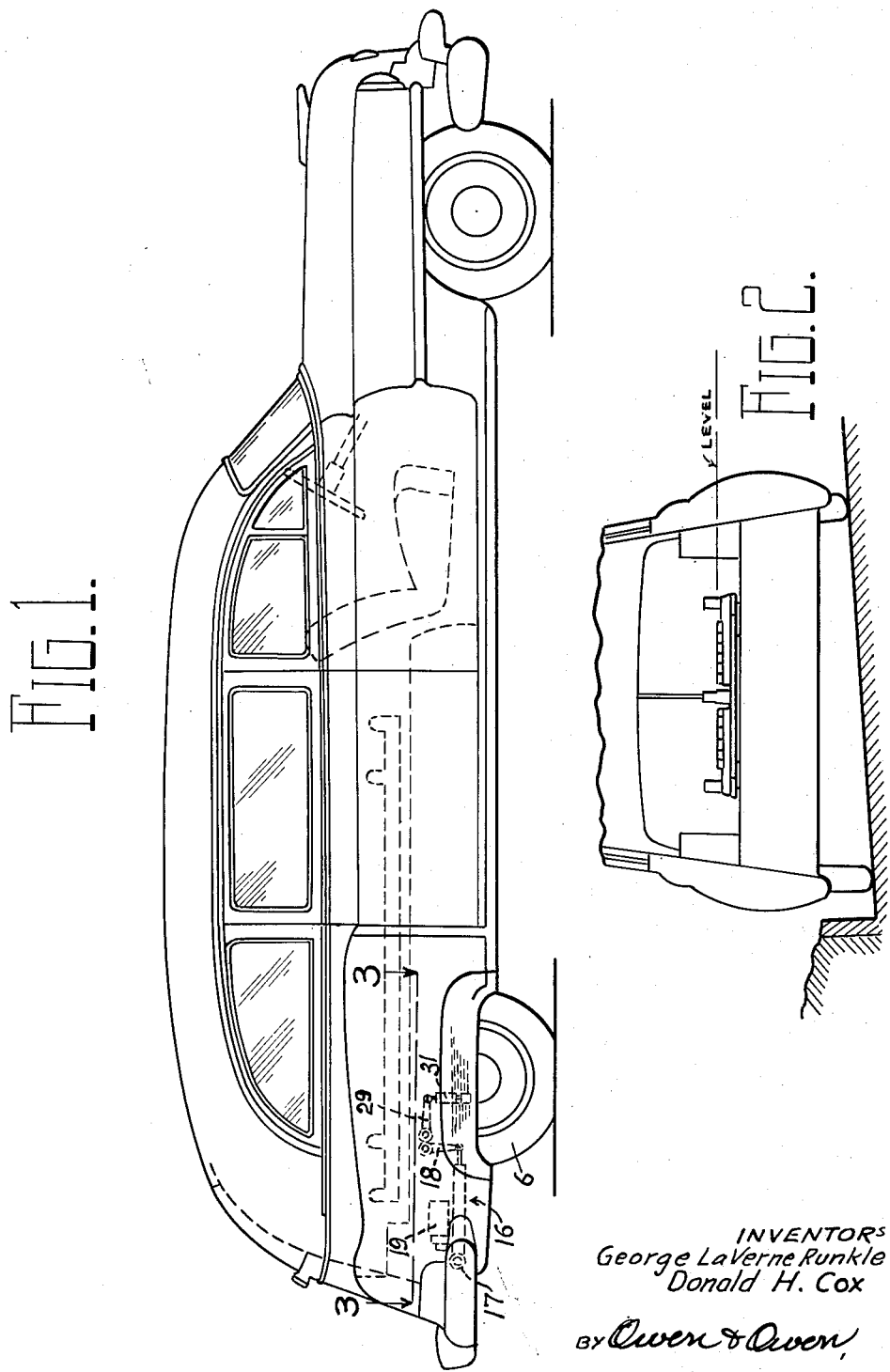

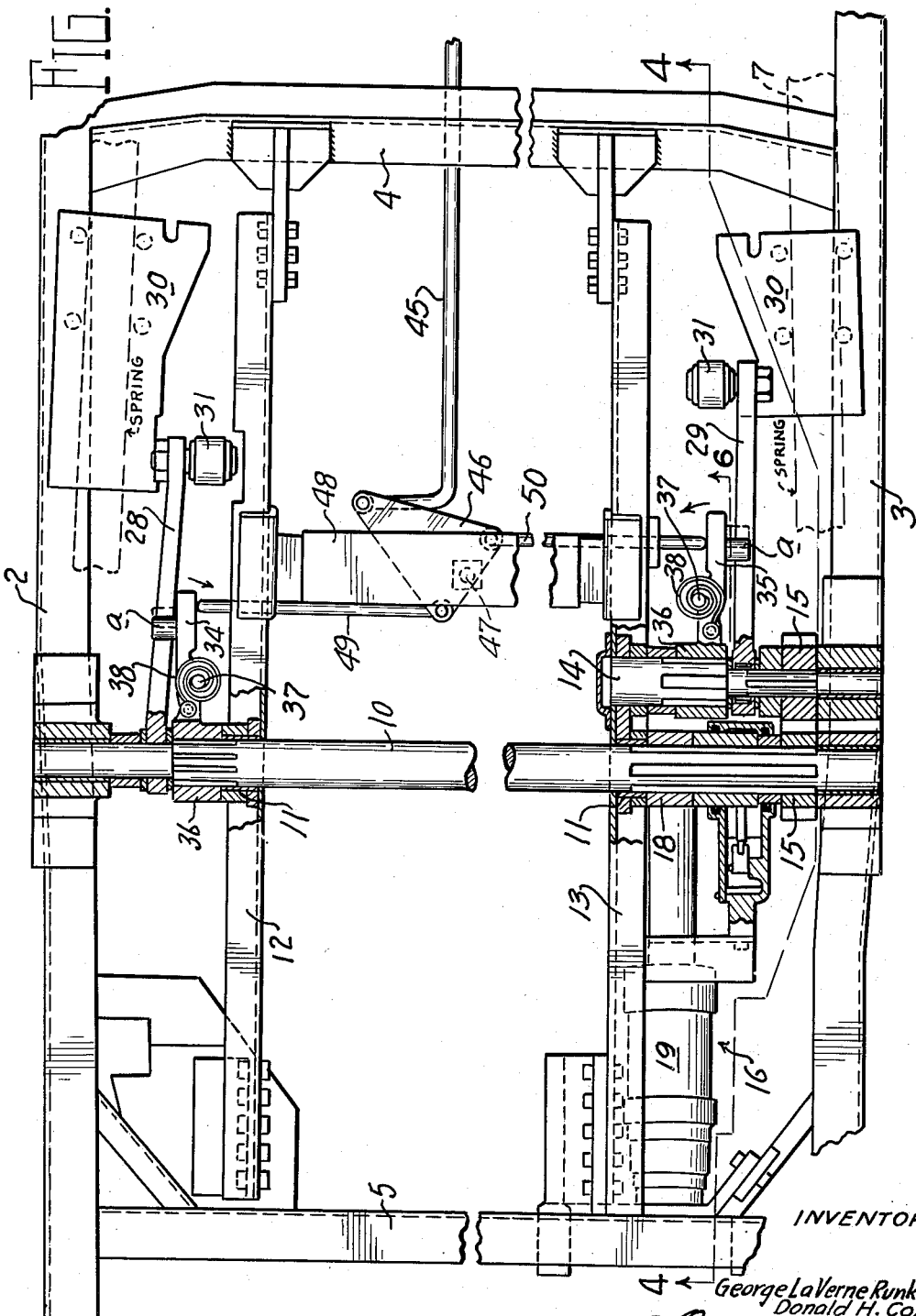

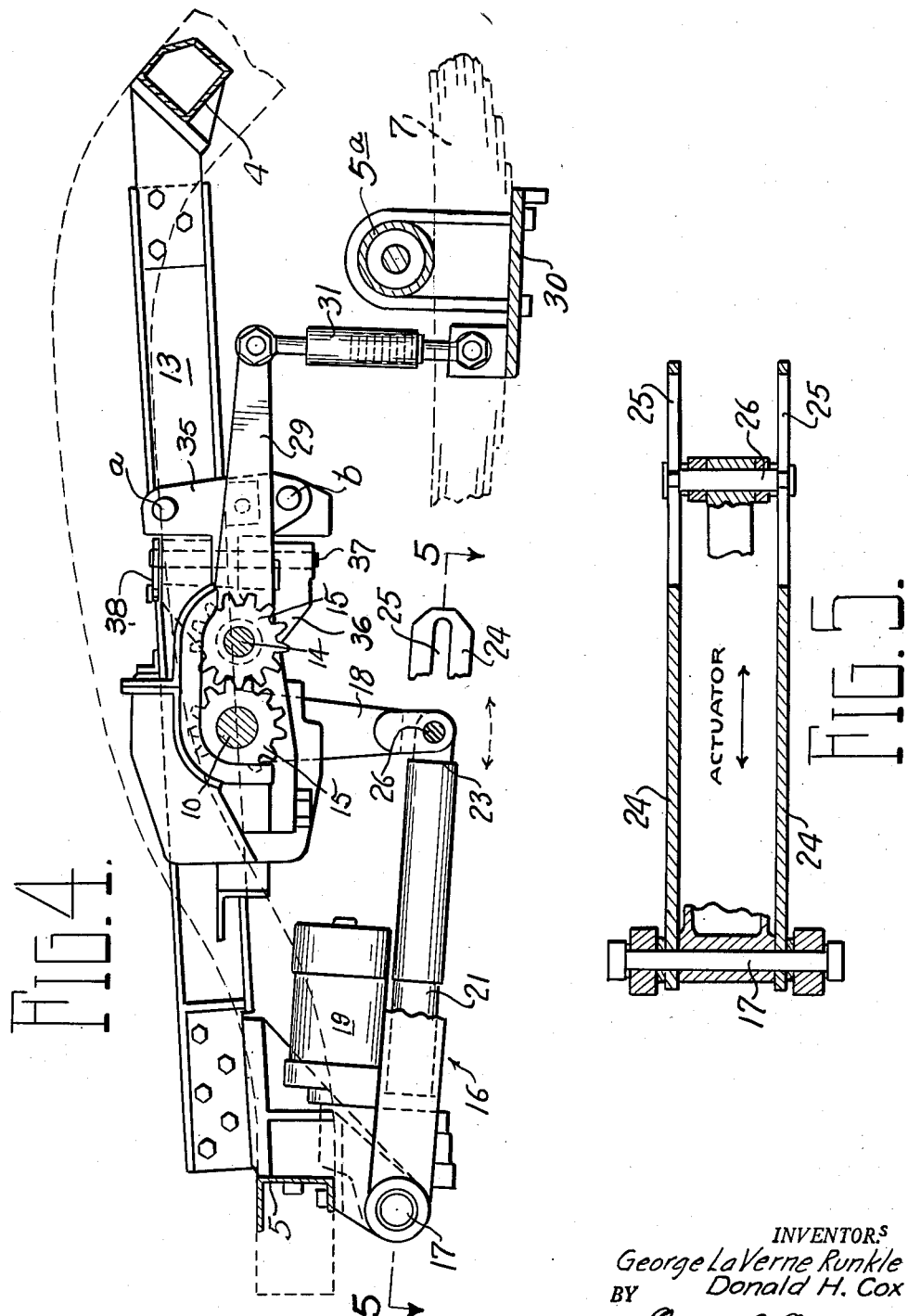

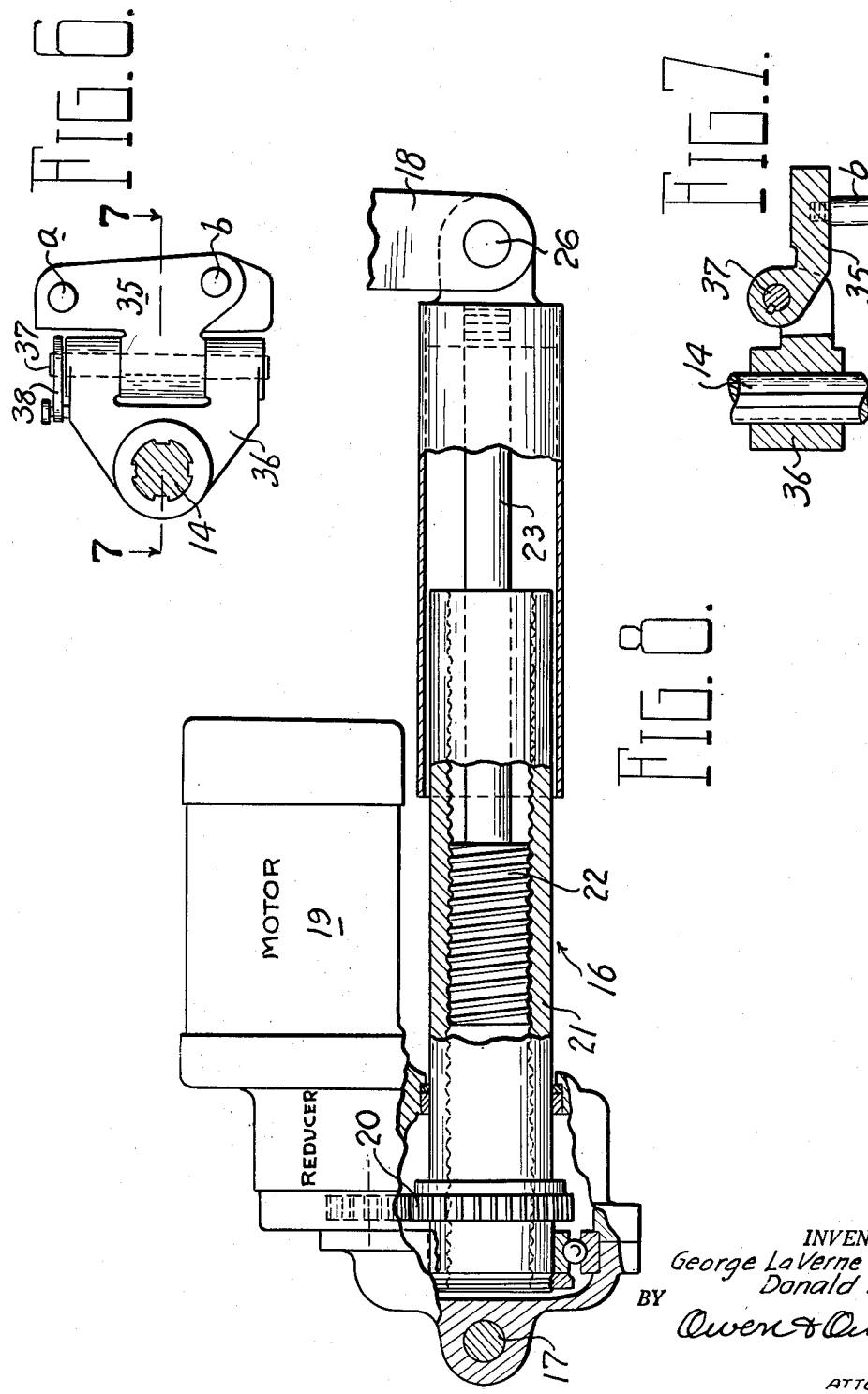

2,654,633

UNITED STATES PATENT OFFICE 2,654,633

LEVELING MEANS FOR VEHICLES

George La Verne Runkle and Donald H. Cox, Lima, Ohio, assignors to Superior Coach Corporation, Lima, Ohio, a corporation of Ohio Application January 29, 1952, Serial No. 268,858

11 Claims. (Cl. 296—16)

This invention relates to leveling means for use in vehicles, and is particularly intended for use in connection with hearses to level the bodies thereof, to facilitate placing coffins therein or removing them therefrom.

It is important in the use of hearses and similar vehicles to be able to level the body with respect to the axles when the vehicle is setting in loading or discharging position adjacent to a curb and therefore in side tilting position, as otherwise the loading or discharging operation will be rendered awkward and difficult and will not be pleasing to persons viewing the operation.

An object of the invention is the provision of novel, simple, efficient and easily controlled means of the character described, which is operable to uniformly raise one side and lower the other side of a vehicle body a desired extent, within limits, relative to the chassis wheels and axles, and then to return the parts to normal position.

Another object of the invention is the provision of novel and efficient means for raising and lowering a side of a vehicle body a desired extent within limits, relative to the chassis rails and axles, and then to return the parts to normal position.

A further object of the invention is the provision of a leveling means of this character which is normally free from operating connection between the vehicle body and axles and has control means for effecting a positive mechanical connection therebetween to render the leveling means operative.

Other objects and advantages of the invention will be apparent from the following detailed description, and from the accompanying drawings illustrating one embodiment of the invention, in which—

Fig. 1 is a side elevation of a hearse equipped with leveling means embodying the invention, with parts of the leveling means shown in dotted lines; Fig. 2 is a partial rear elevation of the vehicle setting on a side incline and with the body in level position; Fig. 3 is an enlarged section on approximately the line 3—3 in Fig. 1, showing the leveling means in detail, with parts broken away, parts removed and parts in section; Fig. 4 is a vertical section on the line 4—4 in Fig. 3, with parts broken away; Fig. 5 is an enlarged section on the line 5—5 in Fig. 4, with parts broken away; Fig. 6 is an enlarged detail on the line 6 in Fig. 3, with a part in section; Fig. 7 is a section on the line 7—7 in Fig. 6; Fig. 8 is an enlarged side elevation of the leveling means motor unit, with parts broken away; Fig. 9 is an enlarged elevation of the leveling means control mounted on the vehicle dash in view of the operator, with the dash fragmentarily shown; Fig. 10 is a section on the line 10—10 in Fig. 9, and including a portion of the control connection with the leveling means, and Fig. 11 illustrates a simple wiring diagram for the electrical leveling control.

Referring to the drawings, 1 designates a vehicle body that is mounted on the customary chassis frame of which 2 and 3 (Figs. 3 and 4) are the side bars and 4 and 5 are front and rear cross-bars, respectively, located in the present instance at opposite sides of the axle or axle housing 5a supported by the rear wheels 6. Such axle, as is customary, is attached to the frame through the rear springs 7. The leveling mechanism embodying the invention, except for its control, is carried by the chassis frame between the two cross-bars 4 and 5, and includes a long cross-shaft 10 journaled at its ends in the two side bars 2 and 3 substantially midway between the bars 4 and 5 (Fig. 3). The shaft 10 also has intermediate bearings as indicated at 11 (Fig. 3) in supplemental frame bars 12 and 13 connecting the cross-bars 4 and 5 in inwardly spaced relation to the respective side frame bars 2 and 3.

A short cross-shaft 14 is journaled in the frame bars 3 and 13 in rather close parallel relation to the shaft 10. These two shafts are reversely driven one from the other through a pair of meshing gears 15 mounted thereon adjacent to the frame bar 3.

A positive rocking of the shafts 10 and 14 is effected by an actuator unit 16 which is pivoted at one end to the chassis frame at 17 (Fig. 8) and has connection at its other end with one of said shafts, 10 in the present instance, through an arm 18 fixed thereto. The unit 16 comprises an electric motor 19 of the reversing type, the shaft of which is connected through a suitable reduction gearing, a part of which is shown at 20 (Fig. 8), to a cylinder 21 that is suitably mounted at one end for free rotation. This cylinder is internally threaded on a nut 22 having a stem 23 projecting axially outward therefrom and pivotally attaching at its outer end to the arm 18. It is thus evident that the arm 18 and consequently the attached shaft may be turned in one direction or the other, depending on the direction of drive of the motor. A pair of travel indicator strips 24, 24, project forward from the pivot 17 one at each side of the cylinder 21, and each has a longitudinally extending slot 25 (Figs. 4 and 5) that slidingly receives the adjacent end of the pivot pin 26 that connects the stem 23 to the arm 18. One of these arms 24 may have a neutral mark (not shown) for register with the pin 26 when at a neutral point in its travel.

Like rocker arms 28 and 29 project freely forward from and are journaled on the respective shafts 10 and 14 adjacent to the respective side bars 2 and 3, and each connects at its forward or free end to the subjacent spring pad 30 of the respective spring 7 through an adjustable link 31 (Figs. 3 and 4). It is thus apparent that any movement of either spring pad 30 toward or away from the respective frame bars 2 and 3 causes a rocking of the respective rocker arm on its shaft.

At the inner side of each arm 28, 29, is mounted a respective clutch plate 34, 35. Each of these plates has a pair of vertically spaced pins $a$ and $b$ projecting horizontally from its outer side or that adjacent to the respective leveling arm 28, 29, with one above and one below the arm. Each clutch plate is pivoted to a respective hub member 36, the left one of which is keyed on the shaft 10 while the right one is keyed on the short shaft 14 (Figs. 3 and 6), whereby each clutch plate has an arcuate movement with its shaft about its axis when the shaft is rocked. A pivot pin 37 connects each clutch plate to its hub 36 for rocking movements therewith concentric to its rocking axis and also for rocking movements relative to the hub lengthwise of the shaft to which attached. A helical spring 38 connects each pin 37 at one end to the hub 36 and has an inward biasing action on the clutch plate, so that each plate is normally swung inward away from the associated arm 28, 29, with its pins $a$ and $b$ retracted from the path of rocking movements of the respective leveling arms 28, 29. Therefore, during normal running or when the vehicle is being driven, the arms 28 and 29 will be free to rock without any interference by the clutch pins $a$ and $b$.

When the vehicle is on a transverse incline and it is desired to level the body, the clutch plates 34 and 35 are swung outward by a control means to be later described, so as to place the clutch pins $a$ and $b$ thereof into vertical register with the respective leveling arm 28, 29, with one pin above and one below the arm. The actuator 16 is then operated to rock the shaft 10, which in turn, through the gears 15, correspondingly rocks the other shaft (14) in reverse direction. Presuming the turning of the shaft 10 to be clockwise, the left clutch plate 34 is swung downward, thus causing its upper pin $a$ to engage and force the leveling arm 28 downward. At the same time, the right clutch plate 35 on the shaft 14 is swung upward in counterclockwise direction, causing its lower pin $b$ to engage the leveling arm 29 and move it upward at the same speed and to the same extent as the downward movement of the left arm 28. This results in a uniform lowering of the left side and raising of the right side of the vehicle to assume a level position without regard to the tilted position of the wheel axles. If the turning of the shaft 10 is counterclockwise, the leveling action is the same except in the reverse.

The free play of the leveling arms 28, 29, between the respective clutch pins $a$ and $b$ is sufficient to allow for maximum tilting movements of said arms, thus permitting the clutch plates to be thrown into arm clutching positions when the vehicle is standing on a transverse incline. In other words, irrespective of the degree of the incline (within reason of course), the high arm 28 or 29 will be below the associated upper clutch pin $a$ and the lower arm will be above its clutch pin $b$. This permits the clutch plates to swing into arm clutching positions when the vehicle is standing on any normal incline.

The control for the clutch plates 34 and 35, in the present instance, includes a manually operated control lever 40 on the dash of the vehicle. This lever (Figs. 9 and 10) is pivoted in a dash housing 41 at 42 and has an arm projecting through a horizontally disposed slot in the front of the housing to facilitate hand manipulation, and has another arm projecting from the rear of the housing. A flexible wire 43 extends from the rear end of the lever through a guide 44 to a rod 45 which pivotally connects to a triangular lever plate 46 that is pivoted at 47 to a cross-bar 48 between two frame bars 12 and 13. This plate has push rods 49 and 50 projecting in opposite directions from opposite corners thereof transversely of the vehicle and in thrust engagement at their outer ends with the inner sides of the respective clutch plates 34 and 35. It is thus apparent that a movement of the control lever handle to the left from neutral position will pull the wire 43 and rod 45 to shift the lever plate 46 in a direction to force both rods 49 and 50 outward and throw the clutch plates 34 and 35 outward to place them in engaging relation to the respective leveling arms 28 and 29.

The electrical control circuit for the actuator motor 19 is shown diagrammatically in Fig. 11. This circuit includes two normally open switch buttons 52 and 53 mounted on the top of the dash casing 41 the circuit contacts of one being wired to the motor 19 whereby a closing of the switch across such contacts will effect a driving of the motor in one direction, while the circuit contacts of the other switch are so connected with the motor and ground that a closing of such switch will cause a driving of the motor in the opposite direction, as well understood in the art. Each switch circuit may have a respective limit switch 54, 55 in connection therewith and cam-operated by a rotation, for instance, of the shaft 10, so as to open the motor circuit when the shaft has turned a predetermined extent in either direction. By the use of this electrical control together with the manual control of the clutch means effected through a movement of the lever 40, either side of the hearse may be raised or lowered as may be desired.

It is preferable to provide a spirit level vial 55 on the dash adjacent to the control means so as to provide visual means to determine when a level position of the vehicle body has been reached.

It is apparent that during normal operation of the vehicle, the leveling means is entirely disconnected so that the vehicle body has free access on its supporting springs the same as though no leveling means was included in the equipment.

We wish it understood that our invention is not limited to any specific construction, arrangement or form of the parts, as it is capable of numerous modifications and changes without departing from the spirit of the claims.

Having thus described our invention, what we claim as new, and desire to secure by United States Letters Patent, is:

1. A leveling mechanism for a vehicle having a body spring-mounted on a running gear axle, said mechanism including a pair of parallel cross-shafts journaled in said body, an actuator carried by the vehicle and connected to one of said shafts and selectively operable to rock said one shaft in one direction or the other, means connecting the shafts for reversely rocking one from the other, a pair of leveling arms journaled on and freely rockable relative to said shafts in planes transverse to their axes, one adjacent to each side of the body, a connection between the free end of each leveling arm and the said axle to impart movement from one to the other, a clutch arm projecting transversely from and secured to each shaft to turn therewith, one at a side of each of said leveling arms, said clutch arms each having a pair of vertically spaced projections one above and one below the normal horizontal planes of the upper and lower edges of the respective leveling arm, means securing each of said clutch arms for swinging lengthwise of its shaft to place said projections into or out of the path of rocking movements of the respective leveling arm, means associated with said clutch arms whereby said clutch arms normally stand in released relation to the respective leveling arm, and means on said vehicle operable to move said clutch arms into engaging relation to the leveling arms.

2. A leveling mechanism for vehicles having a body frame spring-mounted on a running gear axle, said mechanism including two parallel cross-shafts journaled in the body frame adjacent to said axle, controlled actuator means carried by the vehicle and connected, and operable, to rock one of said shafts, a driving connection between the shafts for reverse rocking of one shaft from the other, a leveling arm journaled on each shaft, one adjacent to each side of said frame, each leveling arm being free to rock on its shaft and projecting generally lengthwise of the frame, means anchoring the free end of each leveling arm to the axle to move vertically therewith relative to the body frame, a separate clutch member secured on each shaft and rockable therewith about its axis, one clutch member being associated with one of said leveling arms at a side thereof and the other clutch member being associated with said other leveling arm at a side thereof, each of said clutch members being rockable relative to its shaft lengthwise thereof, biasing means acting to normally swing each clutch member away from the adjacent arm, a pair of vertically spaced projections on the leveling arm side of each of said members for lost-motion clutch connection with the arm above and below the same when swung toward it, and means on said vehicle operable to move said clutch members into clutch engagement with the respective leveling arm whereby a rocking of said shafts will raise one leveling arm and lower the other to laterally tilt the body frame relative to the axle.

3. A leveling mechanism for vehicles having a body frame spring-mounted on a running gear axle, said mechanism including a shaft journaled crosswise of the frame adjacent to said axle, a leveling arm projecting from the shaft lengthwise of the frame adjacent to one side thereof and journaled on and rockable independently of the shaft about its axis, actuator means operable to rock the shaft in one direction or the other, means anchoring the free end of said leveling arm relative to the axle, clutch means fixed to the shaft to rock therewith and having a member projecting lengthwise of said arm at a side thereof and movable toward and away from the arm lengthwise of the shaft axis, means normally biasing said member away from the arm, manually controlled means on the vehicle for moving said member toward and holding it in clutching relation to said arm, said member, when moved toward the arm, having clutch connection therewith, whereby the shaft connecting end of the arm will be raised or lowered with corresponding movements of the clutch means about the shaft axis and the associated side of the body frame will be raised or lowered therewith relative to the axle.

4. A combination as called for in claim 3, wherein the clutch member has lost-motion connection with the leveling arm when in clutching relation thereto.

5. A combination as called for in claim 3, wherein the actuator means includes a manually controlled reversible electric motor.

6. A leveling mechanism for vehicles having a body frame spring-mounted at its rear portion on a supporting wheel axle, said mechanism including a rock-shaft journaled on the frame crosswise thereof at one side of said axle, a leveling arm journaled on and projecting from the shaft toward the axle and freely rockable relative to the shaft about its axis, a connection anchoring the free end of said arm to the axle, first clutch means secured on and rockable with said shaft and normally disengaged from said arm, a second rock-shaft journaled on and crosswise of the frame parallel to said first shaft, an operative connection between said shafts causing a like reverse rocking of one from the other, manually controlled means on said vehicle and connected to one of said shafts to selectively rock it in one direction or the other, a second vertically rockable leveling arm journaled on and projecting freely from said second shaft toward said axle and adjacent to the opposite side of the frame of said first arm, a connection anchoring the free end of said second arm to the adjacent end of said axle, second clutch means secured on and rockable with said second shaft and normally disengaged from said second arm, and means on said vehicle operable to move said first and second clutch arms into clutch engagement with the respective leveling arms, whereby one leveling arm is raised and the other lowered relative to its anchoring means to effect a predetermined lateral tilting of the body frame relative to the axle.

7. A combination as called for in claim 6, wherein each of said two clutch means includes a part swingable lengthwise of the respective shaft toward and away from the associated leveling arm, and means biasing each of said parts away from its leveling arm, said operable means acting against each clutch part in opposition to the biasing means to move said parts toward and hold them in clutch engagement with the respective leveling arm.

8. A combination as called for in claim 6, wherein each clutch means has predetermined lost-motion clutch engagement with the respective arm, thereby permiting the arms to have predetermined free rocking movements relative to the respective clutch means when in engaging relation therewith.

9. A combination as called for in claim 6, wherein said operable means for the clutch means comprises oppositely movable push-rods for engaging and simultaneously moving the first and second clutch means into clutch engagement with the respective leveling arms, together with remotely disposed manually operable control means operable to project and retract said rods.

10. A leveling mechanism for a vehicle having a body spring-mounted on an axle, said mechanism including a pair of parallel cross-shafts journaled in the body, means carried by the vehicle and selectively operable to simultaneously reversely drive said shafts in one direction or the other, a pair of leveling arms, one adjacent to each side of the body, means journaling said arms for vertical rocking movements relative to the body in a plane transverse to the shaft axes and adjacent to a respective cross-shaft, a connection between the free end of each leveling arm and said axle to impart movement from one to the other thereof, a clutch member secured to each shaft to turn therewith and projecting transversely therefrom at a side of the respective leveling arm, means securing each of said clutch members for movements lengthwise of its shaft to place it into and out of engaging relation to the associated leveling arm, means connecting and imparting predetermined rocking movement from each clutch member to the adjacent leveling arm when the associated member and arm are in engaging relation whereby the respective side of the vehicle body is raised or lowered relative to the axle depending on the direction of rocking of the associated shaft, and means on the vehicle operable to move said clutch arms into engaging relation to the leveling arms.

11. A combination as called for in claim 10, together with means associated with said clutch members whereby said members normally stand in released relation to the respective leveling arm.

GEORGE LA VERNE RUNKLE.
DONALD H. COX.

References Cited in the file of this patent

UNITED STATES PATENTS

| Number | Name | Date |
|---|---|---|
| 1,257,704 | Haupt | Feb. 26, 1918 |
| 2,000,230 | Heise | May 7, 1935 |
| 2,148,504 | Richter | Feb. 28, 1939 |
| 2,458,400 | Milliken | Jan. 4, 1949 |
| 2,545,493 | Richter | Mar. 20, 1951 |

FOREIGN PATENTS

| Number | Country | Date |
|---|---|---|
| 261,026 | Switzerland | Aug. 1, 1949 |